(12) United States Patent
Capone et al.

(10) Patent No.: US 8,923,310 B2
(45) Date of Patent: *Dec. 30, 2014

(54) PROTOCOL AND SYSTEM FOR FIREWALL AND NAT TRAVERSAL FOR TCP CONNECTIONS

(75) Inventors: Jeffrey M. Capone, Tempe, AZ (US); Pramod Immaneni, Phoenix, AZ (US)

(73) Assignee: NETGEAR, Inc., San Jose, CA (US)

(*) Notice: Subject to any disclaimer, the term of this patent is extended or adjusted under 35 U.S.C. 154(b) by 222 days.

This patent is subject to a terminal disclaimer.

(21) Appl. No.: 13/197,083

(22) Filed: Aug. 3, 2011

(65) Prior Publication Data

US 2011/0286471 A1 Nov. 24, 2011

Related U.S. Application Data

(63) Continuation of application No. 12/643,707, filed on Dec. 21, 2009, now Pat. No. 7,995,594, and a continuation of application No. 11/260,921, filed on Oct. 27, 2005, now Pat. No. 7,646,775.

(60) Provisional application No. 60/659,556, filed on Mar. 8, 2005.

(51) Int. Cl.
*H04L 12/28* (2006.01)
*H04L 29/06* (2006.01)

(52) U.S. Cl.
CPC ............. *H04L 69/16* (2013.01); *H04L 63/029* (2013.01)
USPC ...................... 370/401; 370/352; 370/395.52

(58) Field of Classification Search
USPC ..................... 370/352, 395.52, 401
See application file for complete search history.

(56) References Cited

U.S. PATENT DOCUMENTS

| 7,065,579 | B2 * | 6/2006 | Traversat et al. | 709/230 |
|---|---|---|---|---|
| 7,328,280 | B2 * | 2/2008 | Takeda et al. | 709/245 |
| 7,333,492 | B2 | 2/2008 | Wu et al. | 370/392 |
| 7,369,537 | B1 | 5/2008 | Kirchhoff et al. | 370/352 |
| 7,646,775 | B2 * | 1/2010 | Capone et al. | 370/401 |
| 7,995,594 | B2 * | 8/2011 | Capone et al. | 370/401 |
| 2004/0116119 | A1 | 6/2004 | Lewis et al. | 455/435.1 |
| 2004/0249974 | A1 | 12/2004 | Alkhatib et al. | 709/245 |
| 2005/0086358 | A1 | 4/2005 | Rosenberg | 709/231 |
| 2005/0228848 | A1 | 10/2005 | Thurston et al. | 709/200 |
| 2006/0215685 | A1 | 9/2006 | Capone | |

OTHER PUBLICATIONS

U.S. Appl. No. 60/659,556, Jeffrey M. Capone.

(Continued)

*Primary Examiner* — Phuc Tran
(74) *Attorney, Agent, or Firm* — Boyle Fredrickson, S.C.

(57) ABSTRACT

A system and a protocol enable transmission between two TCP peers that exist behind one or more firewalls and network address translators NATs to automatically setup a true peer-to-peer TCP connection and exchange data without making changes to the firewall or NAT devices or existing TCP-based applications. In embodiments of this invention, the synchronization between the blind TCP peers is achieved using a system that consists of a registration server, an agent application, and a virtual network interface that together relay and replicate the control signals between the two TCP peers. In addition, embodiments of this invention are also used to traverse the NAT and establish a bi-directional peer-to-peer TCP connection in the firewall.

2 Claims, 11 Drawing Sheets

(56) References Cited

OTHER PUBLICATIONS

J. Rosenberg, J. Weinberger, C. Huitena, and R. Mahy, RFC 3489: "STUN—Simple Traversal of User Datagram Protocol (UDP) Through Network Address Translators (NATs)", Mar. 2003.

Y. Takeda, Internet draft: "Symmtric NAT Traversal using STUN," draft-takeda-symmetric-nat-traversal-00.txt, Jun. 2003.

"Transmission Control Protocol," RFC 793, Sep. 1981.

J. Rosenberger, J. Weinberger, R. Mahy, and C. Huitema, Internet draft: "TURN—Traversal Using Relay NAT," Feb. 2004, <ftp://ftp.isi.edu/internet-drafts/draft-rosenberg-midcom-turn-04.txt>.

UPnP Forum, "Internet Gateway Device (IGD) Standardized Device Control Protocol V 1.0," Nov. 2001.

"Cisco IOS Network Address Translation," Cisco white paper, <http://www.cisco.com/warp/public/cc/pd/iosw/ioft/ionetn/prodlit/1195_pp.htm>.

A. Johnston, Internet draft: "SIP, P2P and Internet Communications," Jan. 2005, <http://www.ietf.org/internet-drafts/draft-johnston-sipping-p2p-ipcom-00.txt>.

* cited by examiner

To Fig. 5B

PROTOCOL AND SYSTEM FOR FIREWALL AND NAT TRAVERSAL FOR TCP CONNECTIONS

CROSS-REFERENCE RELATED APPLICATIONS

This application is a continuation of U.S. patent application Ser. No. 12/643,707, filed with the U.S.P.T.O. on Dec. 21, 2009, which is a continuation of U.S. patent application Ser. No. 11/260,921, filed with the U.S.P.T.O. on Oct. 27, 2005 (Now. U.S. Pat. No. 7,646,775), which is a non-provisional application claiming priority from U.S. Provisional application No. 60-659,556 previously filed with the U.S.P.T.O. on Mar. 3, 2005 by the same inventor. The entirety of the prior applications is incorporated by reference herein.

BACKGROUND OF INVENTION

1. Field of Invention

Embodiments of this invention relate to the field of Internet Protocol (IP) networks, Transmission Control Protocol (TCP), Peer-to-Peer protocols and more particularly to the traversal of firewalls and network address translators (NATs) for TCP connections.

2. Discussion of Related Art

The Internet has been designed around a client server model where many clients initiate a connection to communicate with a single server, for example many web-browsers accessing a web-server, which is know as a client-server model and protocols to support this model have been develop such as HTTP, FTP, etc. However, this model is not well-suited for many types of applications where only two parties need to communicate, for example in an Internet voice or chat conversation, where one peer may initiate a connection with another peer. This model is known as a peer-to-peer model.

Recently, the Internet Engineering Task Force (IETF) and other private organizations have developed peer-to-peer protocols such as Session Initiated Protocol, H.323, Gnutella, etc. to enable peer-to-peer communication. However, these peer-to-peer protocols and applications break when one or more peers exist behind a firewall and network address translator (NAT).

Firewalls and NATs provide many advantages for clients and the Internet itself, such as improved security and improved Internet Protocol (IP) address management and do not pose problems for many client-server applications (such as HTTP) since most servers are publicly available and the client initiates the connection with the server. However, these devices do cause problems for peer-to-peer protocols and applications. Firewalls and NATs conceal the identity of IP clients (i.e., peers) and block transmission control protocol (TCP) call setup requests. Firewalls and NATs make it impossible for one TCP peer to discover another and establish a connection with another. In effect, NATs and firewalls "blind" TCP peers from performing the necessary synchronization (i.e., handshaking) needed to setup a connection between two peers.

Transmission Control Protocol

A TCP connection contains three phases: connection establishment, data transfer and connection termination. The TCP protocol uses a Three Way Handshake protocol to synchronize and establish a connection between two TCP peers and once connected TCP hands off to the application for data transfer and communication.

While it is possible for a pair of end hosts to initiate a connection between themselves simultaneously, typically one end opens a socket and listens passively for a connection from the other. This is commonly referred to as a passive open, and it designates the server-side of a connection. The client-side of a connection initiates an active open by sending an initial TCP segment with SYN flag set to the server as part of the Three Way Handshake. The server-side should respond to a valid SYN request with a TCP segment with the SYN and ACK flags set. Finally, the client-side should respond to the server with a TCP segment with the ACK flag set, completing the Three Way Handshake and connection establishment phase.

The TCP Three Way Handshake protocol between a client and server is shown in FIG. 3. TCP functions by opening connections to a remote host and is thus connection-oriented. TCP maintains status information regarding the connections it makes and is therefore a reliable protocol guaranteeing data delivery, unlike the unreliable stateless User Datagram Protocol (UDP). A TCP connection is identified by the IP addresses and virtual port numbers used by both ends. During communication, additional numbers are used to keep track of the order or sequence number which indicates what order the segments of data should be reassembled. Finally, a maximum transmission size is constantly being negotiated via a fallback mechanism called windowing. The combination of port numbers, sequence numbers and window sizes constitutes a connection.

In the Internet protocol suite, TCP 703 is the intermediate layer between IP 705 below it, and an application 702 above it as shown in FIG. 7. Applications most often need reliable pipe-like connections to each other to transfer information. Applications send streams of 8-bit bytes to TCP for delivery through the network, and TCP divides the byte stream into appropriately sized segments (usually delineated by the maximum transmission unit (MTU) size of the data link layer of the network the computer is attached to). TCP then passes the resulting packets to IP, for delivery through an Internet to the TCP module of the entity at the other end. TCP checks to make sure that no packets are lost by giving each byte a sequence number, which is also used to make sure that the data is delivered to the entity at the other end in the correct order. The TCP module at the far end sends back an acknowledgement for bytes which have been successfully received; a timer at the sending TCP will cause a timeout if an acknowledgement is not received within a reasonable round trip time, and the (presumably lost) data will then be re-transmitted. The TCP checks that no bytes are damaged by using a checksum; one is computed at the sender for each block of data before it is sent, and checked at the receiver.

Firewalls and Network address translation

Most homes' and offices' Internet connections are managed by a router that performs firewalling and network address translating functions (NAT). These functions have become a standard features in routers for homes and small-offices even though according to specifications routers should not act as firewalls. However, it is a convenient and widely-used technique. The routers that perform these functions will be referred to as firewalls.

In a typical configuration, a local network uses one of the designated "private" IP address subnets (such as 192.168.0.x or 10.0.x.x), and a firewall on that network has a private address (such as 192.168.0.1) in that address space. The firewall is also connected to the Internet with a "public" address assigned by an ISP. As traffic passes from the local private network to the Internet, the source address on the packets are translated on the fly from the private addresses to a public address. The firewall tracks basic information about each active connection. When a reply returns to the firewall, it uses the connection tracking information it stored during the out-bound phase to determine where on the internal network to forward the reply. To the sending host on the Internet, the firewall itself appears to be the source/destination for this traffic.

Clients behind firewalls do not have true end-to-end connectivity and cannot participate in some Internet protocols. Services that require the initiation of TCP connections from the outside network can be disrupted. Unless the firewall makes a specific effort to support such protocols, incoming packets cannot reach their destination.

There are four types of NAT operations used in firewalls:
1. Full Cone
2. Restricted Cone
3. Port Restricted Cone
4. Symmetric For a given internal address, the first three types of NAT maintain a mapping of this internal address that is independent of the destination address. The fourth type of NAT will allocate a new mapping for each independent destination address.

Unless the NAT has a static mapping table, the mapping that opens when the first packet is sent out from a client through the NAT may only be valid for a certain amount of time unless packets continue to be sent and received on the mapped port of the firewall.

Full Cone

In the case of the full cone, the mapping is well established and anyone from the public Internet that wants to reach a client behind a NAT only needs to know the mapping scheme in order to send packets to it. For example, an internal host behind a NAT with IP 10.0.0.1 sending on port 7400 and receiving on port 7450, is mapped to the external IP address and port on the firewall of 68.14.125.248 and 12867. Anyone on the Internet can send packets to that IP address and port and those packets will be passed on to the client machine listening on port 7450.

Restricted Cone

In the case of a restricted cone NAT, the mapping to the external IP address and port pair is only opened up once the internal client sends out data to a specific destination IP address. Unlike a full cone NAT, an external host can send a packet to an internal host only if the internal host has previously sent a packet to the specific external host. However, since the mapping only depends on the internal host IP address and port, packets from different external hosts will both use the same mapping through the NAT.

Port Restricted Cone

A port restricted cone NAT is almost identical to a restricted cone NAT, but in this case the restriction includes port numbers. Therefore, the firewall will block packets from an external host with source IP address (216.239.14.68) and port (6478) until the internal host has sent a packet to that IP address and port. Again since the mapping only depends on the internal host IP address and port, if the client has sent out packets to multiple IP address port pairs, they can all respond to the client and all of them will respond to the same firewall mapped port.

Symmetric

A symmetric NAT is the most restrictive and is different from the first three in that a specific mapping depends on internal host—source IP address and port—as well as external host—destination IP address and Port. As in the case of the restricted NAT, the external mapping to the firewall IP address and port pair is only opened up once the internal host sends out data to a specific destination.

NAT with port address translation typically involves source address translation (SNAT), which maps the IP address and port of the internal host which initiated the connection to the firewall IP address and port; and its counterpart, destination address translation (DNAT) which reverses the mapping. In practice, both are usually used together in coordination for two-way communication.

The TCP handshaking protocol between a client in a private network and a public server is show in FIG. 4. No special setup is required for setting up a connection in this configuration.

Standard NAT Behavior

The function of a NAT is to translate from internal addresses and ports to an external firewall addresses and ports. A NAT by definition is not a firewall and therefore should do the simplest operation possible to achieve its objective. The default behavior is to alter the connection as little as possible. This means that NAT will attempt to preserve the original source port and will not change it unless that port on the firewall is currently being used by another connection. If this source port is already allocated NAT will attempt to find the next highest value in its group 0-511, 512-1023 or 1024-65535.

TCP Connection Management in Firewalls

The Transmission Control Protocol (TCP) is connection-oriented and stateful, which makes it much more manageable by a firewall than the connectionless User Datagram Protocol (UDP). For this reason, many firewalls do not allow UDP traffic to enter or leave their private networks.

Firewalls that mange the state of a connection (i.e., staeful) are inherently more secure than "stateless" counterparts which simply perform packet filtering. These firewalls track the state of the connection which should not be confused with the state of the TCP connection. Connection tracking refers to the ability to maintain state information about a connection in memory tables, such as source and destination IP address and port number pairs, protocol types, connection state and timeouts.

A typical stateful firewall is shown in FIG. 2. This diagram illustrates the general operation of most firewalls 200 where packets can be generated 205 and received 203 locally, as is the case when the firewall is executed on the local host itself, or received and forwarded to and from remote hosts, as is the case when many hosts share one firewall. All packets that are received from remote hosts whether private internal hosts or public external hosts, travel through the remote interface 201. Each packet that is received on the remote interface is processed by the Pre-Routing stage 202 where it may be destination network address translated (DNAT) if it needs to be routed through the private network or onto the local machine. If the packet is not destined for the local machine, then it is processed by the Forward stage 204 and the Post-Routing stage 206. In the Forward stage, rules may be applied on how to filter each packet, and at the Post-Routing stage source network address translation (SNAT) may be applied if it needs to be routed through the public network. If a packet is destined for the local machine then it is processed by the Input stage 203, and if the local machine generates it then it is processed by the Output stage 205 and next processed by the Post-Routing stage. At any stage, filter rules may be applied that drop and change packet information. It is assumed that the firewall uses stateful inspection by managing a connection-tracking table for all connections through the firewall.

An entry in the connection-tracking table contains information as to the source IP address and port and the destination IP address and port as well as the state of the connection. The possible states of each connection is are INVALID meaning that the packet is associated with no known connection, ESTABLISHED meaning that the packet is associated with a connection which has seen packets in both directions, NEW meaning that the packet has started a new connection or otherwise associated with a connection which has not seen packets in both directions, and RELATED meaning that the packet is starting a new connection, but is associated with an existing connection, such as an FTP data transfer. This state information may be used in designing filter rules for how TCP connections are managed. Once a connection in the firewall is in ESTABLISHED state, the connection may be valid and exist for days even without any data exchange.

Filter rules in firewalls are typically designed so that peers (i.e., clients) in the private network cannot receive incoming TCP connection setup requests and therefore cannot set up a connection. Firewalls block connections to peers by dropping special packets that are involved in the handshaking process of establishing a TCP connection. Firewalls effectively "blind" the TCP peers from seeing each other.

Firewall and NAT Traversal for TCP Connections

Firewalls and NAT devices are located at the edge of virtually all business and most residential DSL and cable modems bundle firewalls and NATs. Therefore, the firewall and NAT traversal problem is one that affects both business users and residential users who use Internet applications that employ UDP or TCP for Internet communication. TCP is a connection-oriented transport protocol that makes it more reliable and secure compared to UDP. For this reason, many Internet applications require a TCP connection for communication. Furthermore, because the lack of connection set up and therefore difficulty to manage in a firewall, many firewalls are configured not to allow UDP traffic to enter or leave the private network. Therefore, firewall and NAT traversal for TCP connections is a challenge that must be solved in order to deliver public IP-based services. Overcoming this traversal problem will lead to widespread deployment of IP services to any subscriber with a broadband connection.

The firewall and NAT traversal problem for TCP connections is much more difficult than for UDP since TCP is connection-oriented and it has a well-defined connection protocol that is effectively managed by the firewall. In addition, the two TCP layers themselves need to be synchronized.

This problem can be broken down into three equally important components:
1. Traverse the NAT
2. Establish a bi-directional TCP connection in each peer firewall
3. Synchronize the peer TCP layers NAT traversal is a well-known and studied problem for UDP traffic. The basic problem, which is common to both UDP and TCP, is that peers behind NATs are not reachable by external hosts. For TCP however, the problem is compounded since the firewall filters TCP control messages making it even more difficult to establish a NAT mapping in the firewall.

The role of the firewall is to protect the network from being accessed by unauthorized sources. It does this by decisions based on the direction of traffic flow. Typically in a private network, incoming traffic is only allowed if the connection was initiated from a device on the internal private network. Therefore, establishing a bi-direction TCP connection in a firewall is not a problem when the connection source (initiator) is behind the firewall and the destination is publicly available. In this case, the firewall will allow TCP segments with SYN flags set to leave network but not enter the network. Furthermore, only TCP segments with a SYN flag set can create a connection in a firewall, and the connection does not reach its ESTABLISHED state until the final TCP segment with ACK flag set is sent out (see FIG. 4). However, when both hosts are behind firewalls, there is a deadlock situation since neither host can initiate the connection. Any approach to solving this problem must allow secure two-way communication without any changes to firewall filtering rules, or reducing the current level of security provided by the firewall.

Two TCP peers need to exchange a series of control segments in order to setup a connection and exchange data, as shown in FIG. 3. When the TCP peers are behind firewalls and NATs, they cannot receive these control messages that are needed to establish a TCP socket connection so that the application can send and receive data. These TCP layers are blinded and need to be synchronized before a socket can be used by the application.

Prior Art

There has been a range of proposed solutions to NAT traversal for peer-to-peer UDP traffic. The current proposals for solving NAT traversal are:
1. Manual Configuration
2. Universal Plug and Play (UPnP)
3. Simple Traversal of UDP through Network Address Translation devices (STUN)
4. Traversal Using Relay NAT (TURN)
5. Symmetric NAT Traversal using STUN
6. Application Layer Gateway
7. Tunnel Techniques These solutions attempt to address the NAT traversal problem for only the much simpler case of UDP. Some do not solve the problem in an automatic way for the consumer and some require modification to existing applications and firewalls. Others require addition of relays which prevent a true peer-to-peer connection. Furthermore, none of these solutions address the problems inherent in establishing a true peer-to-peer TCP connection in the firewall and synchronizing the TCP layers.

Manual Configuration

The manual configuration method of NAT traversal requires manual intervention. The firewall needs to be manually configured using a browser, a graphical user interface-based tool, or a command line interface tool to change settings and enter static mappings for each client. Each client needs to have a fixed IP address and port for receiving the TCP connection. While this may be an option for some technical enthusiasts, many consumers do not feel comfortable doing this. Furthermore, many peer-to-peer connections need to be setup on demand and dynamically configured. Contacting an organizations IT department to make the necessary changes for each connection is not a feasible solution.

Universal Plug and Play—UPnP

UPnP is a technology predominantly targeted at home-office users and residential installations. One of the driving forces behind UPnP is Microsoft Corporation. The UPnP architecture addresses a number of general issues and is designed to allow simple configuration of small networks by un-skilled people. UPnP allows client applications to discover and configure network components, including NATs and Firewalls, which are equipped with UPnP software. Applications need to discover and use the external IP address and port that the NAT selects for the connection.

To achieve the traversal, applications and firewalls need to be modified to support UPnP. While many small end NAT vendors are committed to supporting UPnP, there are few applications available.

Simple Traversal of UDP through Network Address Translators (STUN)

The STUN protocol enables a client to discover whether it is behind a NAT, and to determine the type of NAT. STUN identifies the public side NAT details by inspecting exploratory STUN messages that arrive at the STUN server. The STUN client sends an exploratory message to the external STUN server to determine the transmit and receive ports to use. The STUN server examines the incoming message and informs the client which public IP address and ports were used by the NAT.

STUN has received a lot of attention as a technique in the Internet Engineering Task Force (IETF), but only work with some NATs. STUN does not work with symmetric NATs, which are commonly found in corporate networks and even in the residential market. STUN only supports NAT traversal for UDP for a limited set of NATs and does not address the need to support TCP applications or assist in setting up the TCP connection.

Traversal Using Relay NAT (TURN)

The IETF has proposed Traversal Using Relay NAT (TURN) that is designed to solve the UDP traversal issue for symmetric NATs. TURN has been proposed to complement the limitation of STUN; however, this type of solution requires a relay server somewhere on the public network, which is an additional cost for service providers and end users that want to set up a peer-to-peer connection. The addition of the relay prevents a true peer-to-peer connection and compromises performance, cost and security. In addition, TURN does not address the issues associated TCP connections such as synchronizing "blind" TCP peers and establishing a TCP connection in the firewall.

Symmetric NAT Traversal Using STUN

This approach proposes a method for symmetric NATs to obtain more detailed characteristics of symmetric NATs using STUN, and describes how to establish a peer-to-peer UDP connection even in situations where the NATs (including symmetric NATs) are present at both ends. Even though this method enhances the support for STUN, it still is only applicable to UDP traffic and like STUN itself, does not address issues of traversing firewalls and NATs for TCP connections.

Application Layer Gateway (ALG)

This technique relies on the installation of a new enhanced firewall called an Application Layer Gateway that understands the signaling messages and their relationship with the resulting media flows. ALG require knowledge of each application using the TCP connection and must be manually configured for that application. ALG suffer from the same problems as manual firewall configuration.

Tunnel Techniques

This method achieves NAT traversal by tunneling control signals and data exchange through the existing to a public address space server. This method requires a new server within the private network and another in the public network. These devices create a tunnel between them that carries all the traffic through the firewall. The addition of the relays prevents a true peer-to-peer connection and compromises performance, cost and security.

SUMMARY AND OBJECTS OF THE INVENTION

Firewalls and Network Address Translators (NATs), while providing many benefits for the clients that exist behind these devices, also come with many drawbacks. The most troublesome of those drawbacks is the fact that they break many existing transmission control protocol (TCP)/Internet Protocol (IP) applications, and make it difficult to deploy new ones such as multimedia applications, file sharing and the like. Together, NATs and firewalls conceal the identity of IP clients (i.e., peers) and block transmission control protocol (TCP) call setup requests making it impossible for one TCP peer to discover another and establish a connection. In effect, NATs and firewalls "blind" TCP peers from performing the necessary synchronization (i.e., handshaking) needed to setup a connection between two peers.

An embodiment of the present invention provides a system and a set of protocols that can be implemented in software or hardware to enable two TCP peers that exist behind one or more firewalls and NATs to automatically setup a true peer-to-peer TCP connection and exchange data. Embodiments of this invention allows the TCP connection between two TCP peers to traverse NATs and firewalls without making changes to the firewall or NAT devices or existing TCP-based applications. Embodiments of this invention can be used to traverse full cone, restricted cone, port restricted cone and symmetric NATs as well as stateful firewalls. In order for a TCP connection to traverse a firewall and NAT, three operations must occur; the NAT needs to be traversed, the TCP peers need to be synchronized and a TCP connection needs to be established in each peer firewall.

An embodiment of the invention involves a set of protocols and a system that can be used to 1) traverse NATs, 2) coordinates the synchronization (i.e., handshaking) between two "blind" TCP peers and 3) establish a bi-directional peer-to-peer TCP connection in each peer firewall. Using embodiments of this invention, these operations can be executed separately and occur sequentially or combined so that synchronizing the TCP peers participates in the traversing the NAT and opening a peer-to-peer TCP connection in the firewall.

In embodiments of this invention, the synchronization between the "blind" TCP peers is achieved using a system that consists of a registration server, an agent application, and a virtual network interface to relay and replicate control signals between the two TCP peers. In addition, embodiments of this invention are also used to traverse the NAT and establish a bi-directional peer-to-peer TCP connection in the firewall.

An embodiment of the invention involves protocols and a system that can be used for wireless and mobile TCP peers to traverse NATs and firewalls. Examples of wireless and mobile TCP peers are wireless PDA, mobile phones, any other portable device that runs the TCP protocol, and the like.

BRIEF DESCRIPTION OF THE DRAWINGS

The accompanying drawings, which are incorporated in and constitute a part of the specification, illustrate embodiments of the invention, and together with the general description given above and the detailed description of embodiments given below, serve to explain the principles of embodiments of this invention.

DETAILED DESCRIPTION OF INVENTION

In the following description of preferred embodiments, references are made to the accompanying drawings, which form a part hereof and in which are shown, by way of illustration, specific embodiments in which the invention may be practiced. It is to be understood that other embodiments may be utilized and structural changes may be made without departing from the scope of the preferred embodiments of the present invention.

Figure 1:
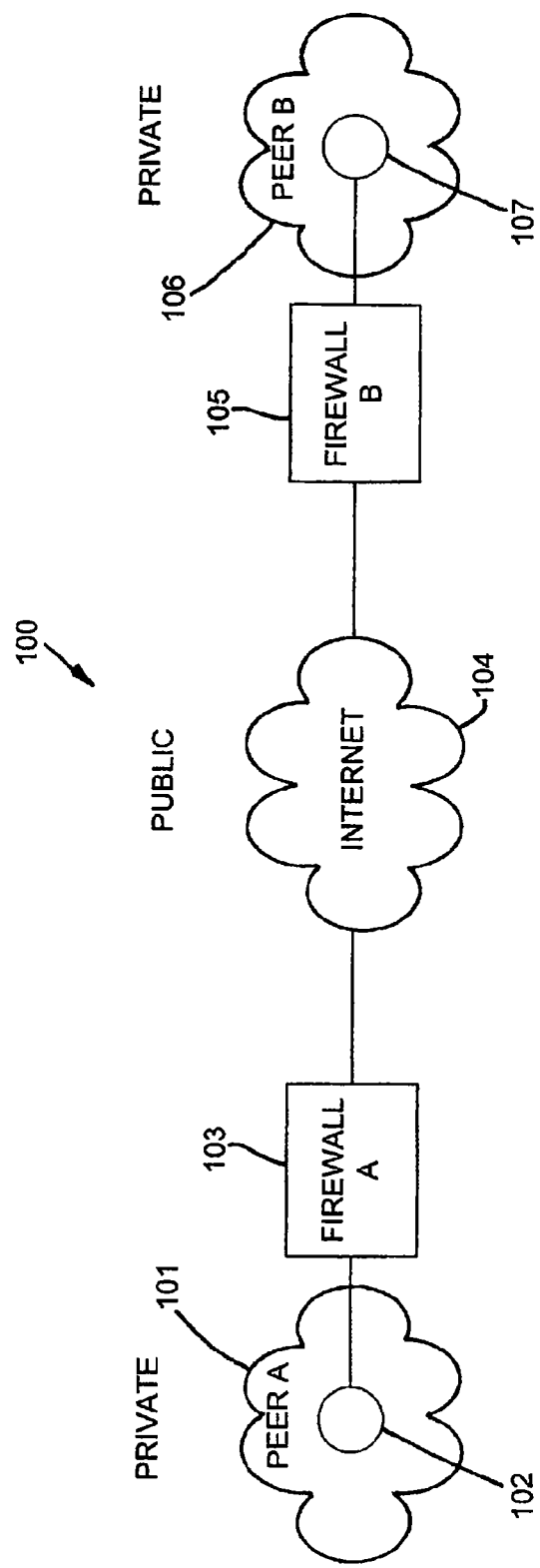
FIG. 1 shows the typical environment in which this invention may be applied.

The physical environment in which this invention may be applied is shown in FIG. 1. The environment 100 consists of two TCP peers (Peer A 102 and Peer B 107) each existing behind a NAT and firewall 103, 105 on a private network 101,106 and connected by any IP network (public) 104, which may be the Internet, and the like. Embodiments of this invention may also be applied if Peer A is behind and NAT and firewall and Peer B is not, as well as if Peer B is behind a NAT and firewall and Peer A is not. Embodiments of this invention may also be applied if Peer A is the requestor and Peer B is the requestee or if Peer B is the requestor and Peer A is the requestee. Embodiments of this invention may also apply if each peer is behind one or more firewalls and NATs.

Figure 2:
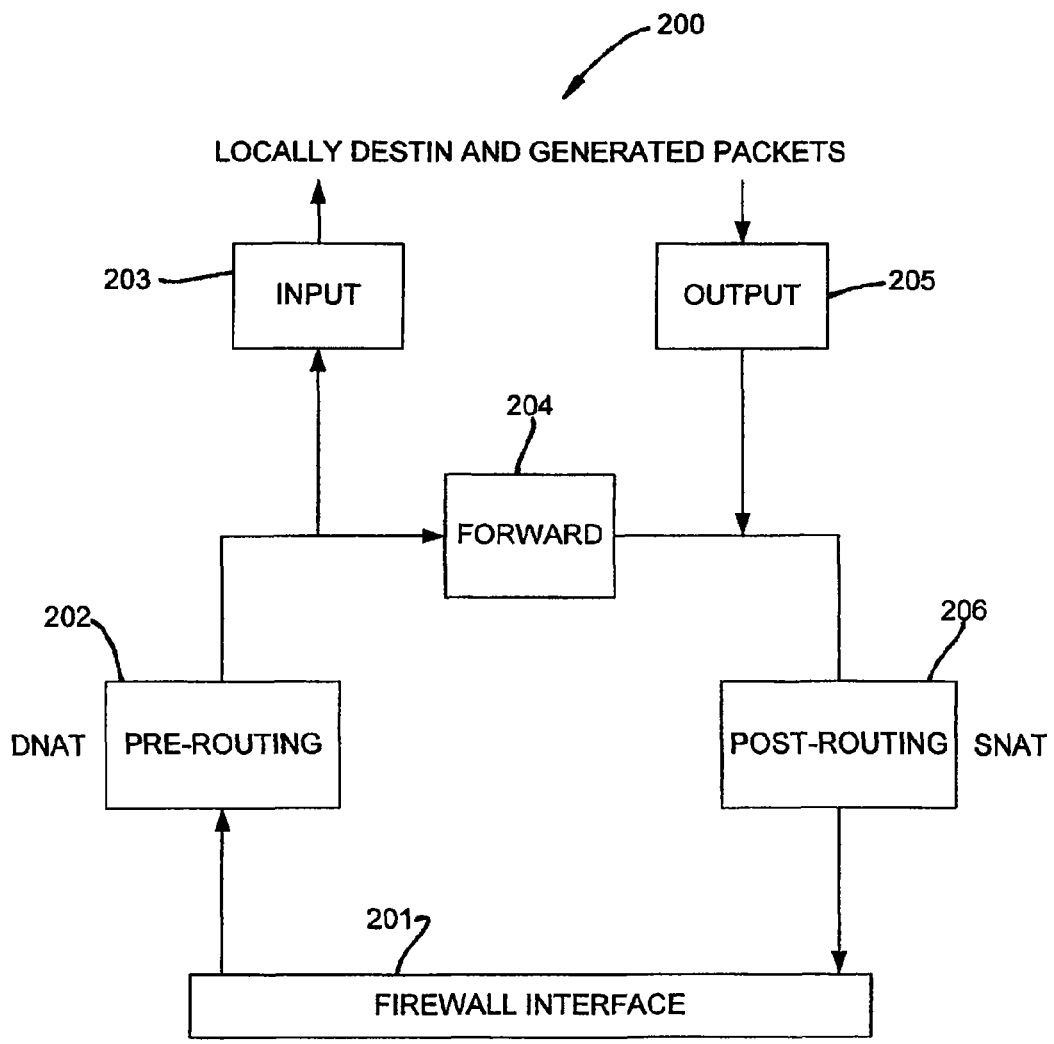
FIG. 2 displays a functional block diagram that represents the processing found in typical firewalls.
Figure 3:
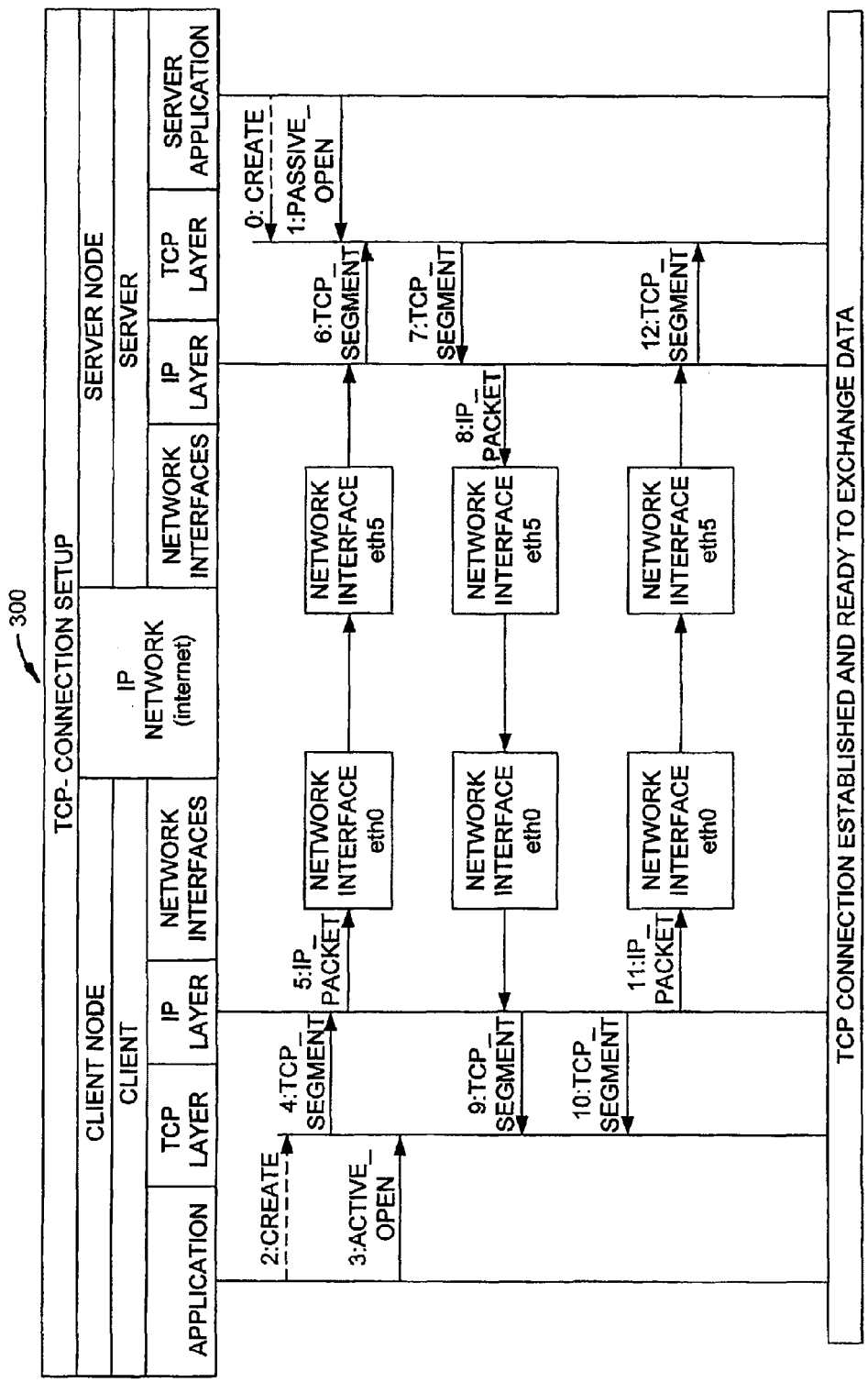
FIG. 3 is a sequence diagram demonstrating a Three Way Handshake protocol used by TCP for connection setup.
Figure 4:
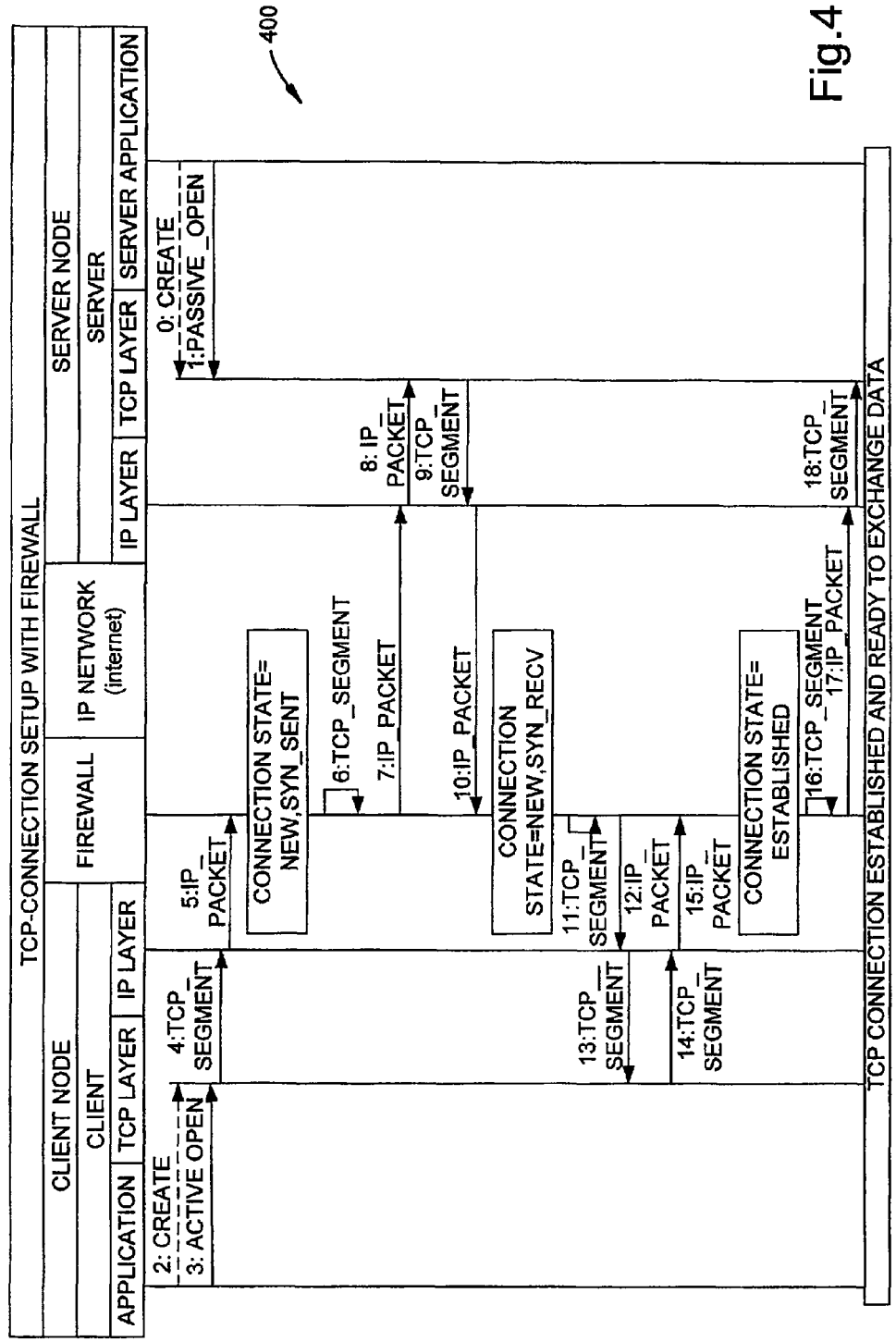
FIG. 4 is a sequence diagram demonstrating the sequence of events when the TCP Three Way Handshake protocol is initiated by a client behind a firewall and NAT with a publicly available server.

An example firewall and NAT, which will be referred to as firewall, is shown in but not limited to FIG. 2. This figure describes the general operation of most firewalls. In particular, the design of embodiments of this invention assumes a symmetric NAT which is the most restrictive NAT technique. However, embodiments of this invention will support firewall traversal for TCP connection for all know NAT techniques.

Filter rules (as discussed in related art) in firewalls are typically designed so that peers (i.e., clients) in the private network cannot receive incoming TCP connection setup requests and therefore cannot set up a connection. Firewalls block connections to peers by dropping special packets that are involved in the handshaking process of establishing a TCP connection. Firewalls effectively "blind" the TCP peers from seeing each other.

Figure 8:
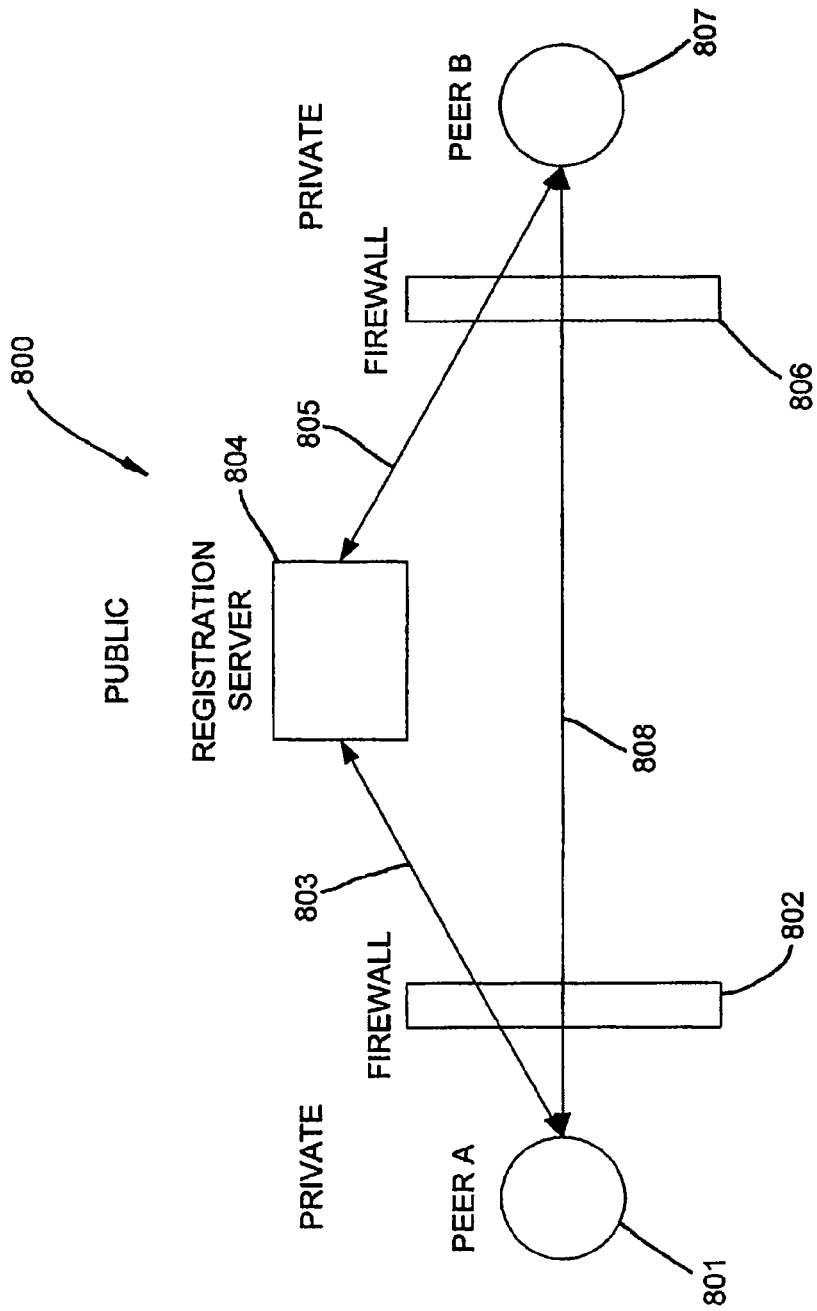
FIG. 8 shows an end-to-end diagram relating Registration Server, Blind Peers, control channel and peer-to-peer TCP connection.

Embodiments of this invention are designed to synchronize and connect two "blind" TCP peers by using a Registration Server (RS) to relay the control signals between the two TCP peers 801,807, as shown in FIG. 8. Each peer sets up a standard TCP connection 803, 805 with the RS 804 and the RS uses these connections as a control channel to pass control messages between the two peers. The RS and control channels assist a "blind" peer in receiving incoming connection requests from the other peer. Once the TCP layers are synchronized, the data channel 808 is used to pass data.

Figure 7:
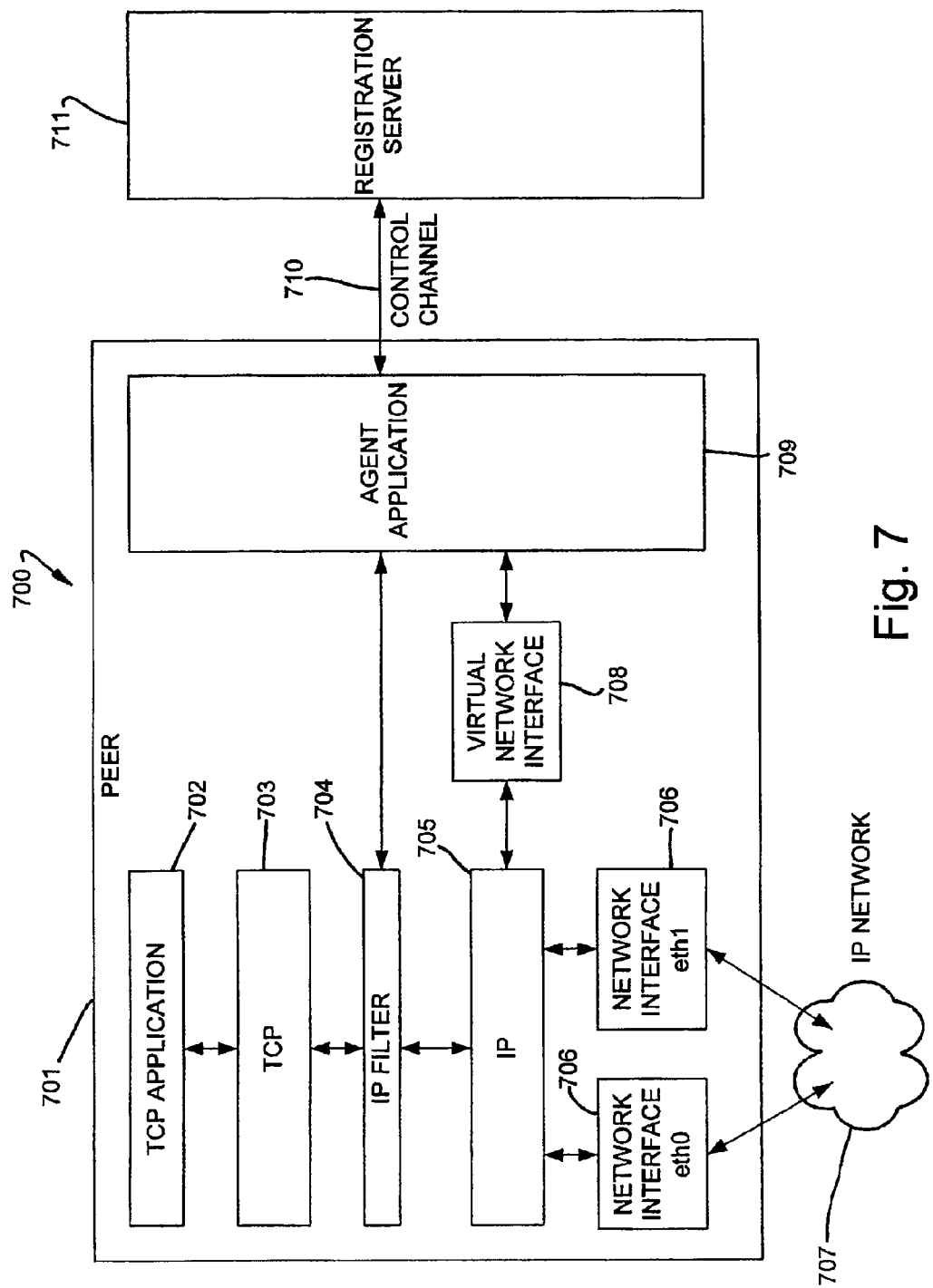
FIG. 7 shows a block representation with respect to the TCP/IP protocol stack of a system used in embodiments of this invention to execute the invented protocols.

An example system used to execute the protocols described in this invention is shown in, but not limited to, FIG. 7. The TCP Application 702, the TCP layer 703, the IP filer 704, the IP layer 705, the network interface layer 706, the virtual network interface 708 and the application agent 709 reside on each of the client 701 machines that will use embodiments of this invention and registration server 711 runs on a publicly available host. The TCP application 702 uses a TCP socket to communicate with another TCP layer on another host. TCP layer 703 is used to open a connection with corresponding TCP layer on anther host. An IP filter layer 704 may be used to selectively drop packets before they are passed up to the TCP protocol or down to the IP protocol layers. The IP layer 705 receives packets from network interface layer 706 that is used to physically interface with each subnet. The virtual network interface (VNI) 708 is used to reconstruct packets (i.e., frames) as instructed by the Agent Application (AA) 709. The VNI appears as any other network interface to the IP layer but not receive packets for the physical network. The Agent Application (AA) 709 is used to send and receive control messages to and from the Registration Server (RS) 711. These control messages are passed over a control channel 710 that is a client-server TCP connection between the AA (client) and publicly available Registration Server (server). This connection may be, for example, a standard TCP client-server connection and no special setup is required to establish this connection for this configuration. The AA also interfaces directly with the physical interface bypassing its TCP/IP stack to send physical layer frames that contain TCP segments to its peer. The Registration Server (RS) is used to proxy the control signals (i.e., call setup signals) between the two peers. Since identity of each peer is concealed, the registration server also manages its own name space that maps assigned node names to exposed IP addresses and ports. The IP address and port of each node may change over time and mapping needs to be updated. The IP address and port may be obtained from the TCP/IP header in the control channel during a probing operation, and the like. Managing a namespace that maps dynamically assigned IP address to an assigned name is a well-known process using distributed hash tables (DHT).

Figure 5A:
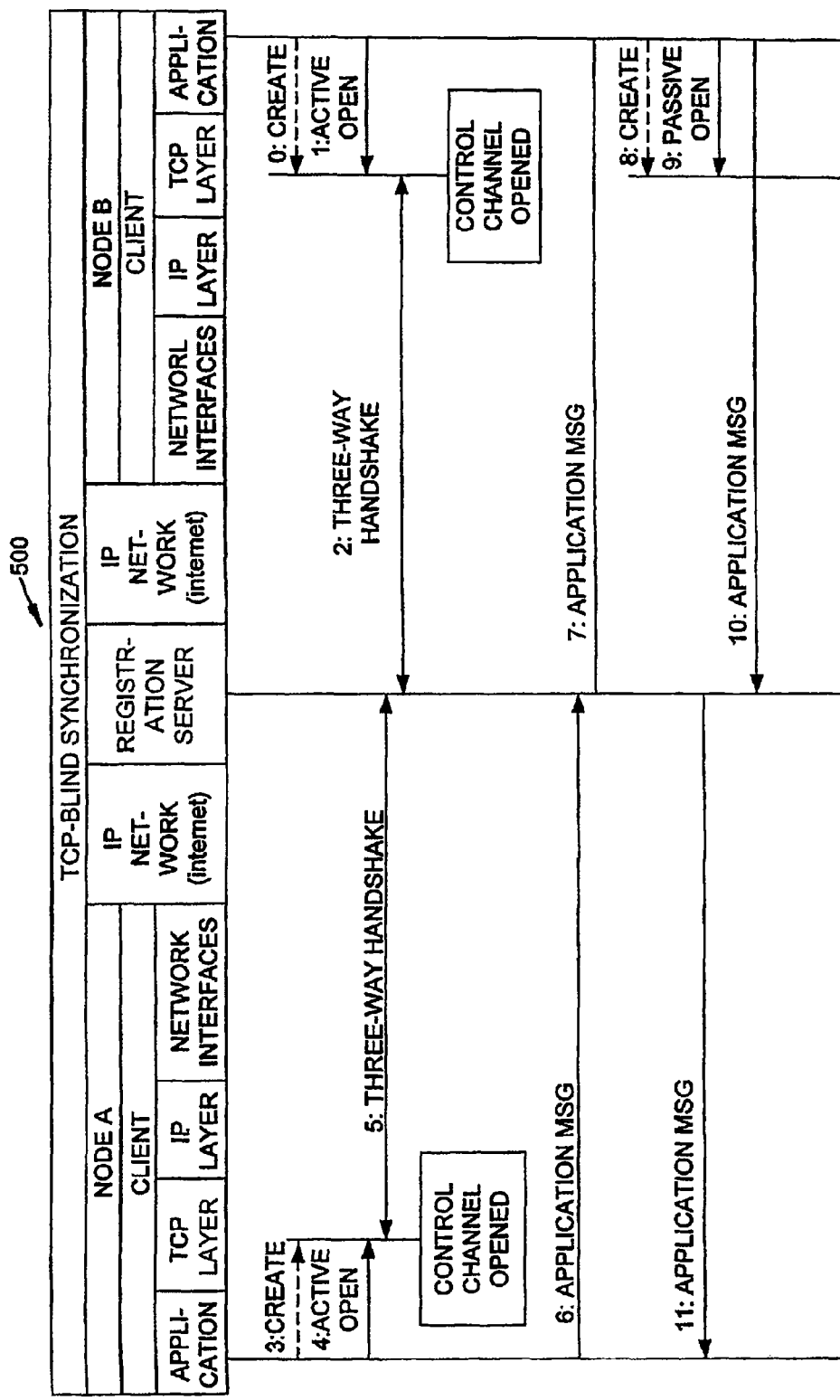
FIG. 5 is a sequence diagram demonstrating the execution of an example of a Blind Synchronization protocol using the system proposed in embodiments of this invention.
Figure 5B:
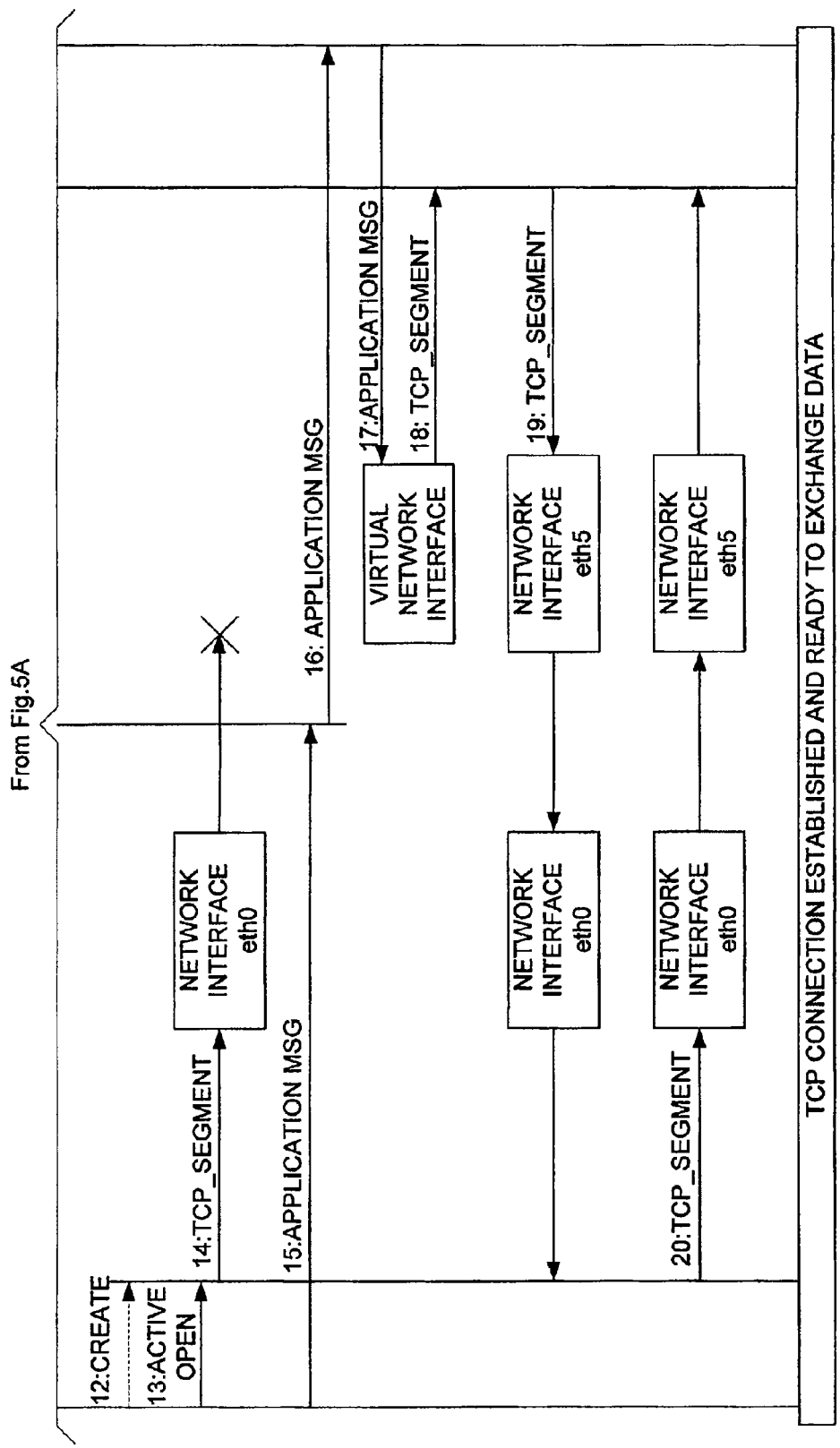

An embodiment of the invention involves using the RS, AA, and the VNI to execute a protocol, referred to as Blind TCP Synchronization, to enable a "blind" TCP peer to receive an incoming TCP connection setup request. A detailed description of Blind Synchronization protocol is given in the sequence diagram in FIG. 5. This diagram describes how this protocol can be executed using the system described in embodiments of this invention. In this diagram it is assumed that Node B is "blinded" and therefore its TCP layer cannot receive incoming connection requests. In this figure it should be noted that Node A and Node B are not explicitly network address translated and only node B is "blinded" in the sense it cannot receive incoming connection requests. TCP layer at Node B may not be able to receive incoming connection requests for a variety of reasons including that of a firewall, IP filter, and the like. The execution of the Blind Synchronization protocol is as follows:

- Steps [0-2]: Node B opens a standard TCP connection with the registration server. No special setup is required since the registration server (RS) is publicly available server and the connection is a standard client-server TCP connection. This connection is used to pass control messages from Node B to the registration server. During this process Node B is identified as a node in the namespace managed by the RS and its mapping is updated.
- Steps [3-5]: Node A opens a standard TCP connection with the registration server. No special setup is required since the registration server (RS) is publicly available server and the connection is a standard client-server TCP connection. This connection is used to pass control messages from Node A to the registration server. During this process Node A is identified as a node in the namespace managed by the RS and its mapping is updated.
- Step [6]: The AA on Node A sends an application message over the control channel to the RS requesting a connection with Node B.

Step [7]: The RS sends an application message over the control channel to Node B requesting that it open a TCP socket connection in a passive open mode.

Step [8,9]: Node B opens a TCP socket connection in passive open mode bound to port Y.

Step [10]: Node B notifies the RS over the control channel that it has opened a socket on port Y.

Step [11]: The RS notifies Node A over the control channel that Node B has opened a socket on port Y and sends the IP address of Node B.

Step [12,13]: Node A opens a TCP socket in active open mode on source port X with destination port Y.

Step [14]: The TCP layer creates a TCP segment with the SYN flag set and sequence number of 0. This segment is passed to the lower layers where it is addressed with the Node B IP address and sent over the network. TCP layer at Node B does not receive this control signal since the TCP layer at Node B is "blind".

Step [15]: The AA at Node A sends an application message over the control channel to the RS notifying that it has opened a socket in active open mode with source port X, destination port Y and sequence number 0.

Step [16]: The RS notifies the AA on Node B that node A opened the socket connection with the parameters source port X, destination port Y and sequence number 0.

Step [17]: The AA on Node B instructs its Virtual Network Interface (VNI) to create a physical layer frame with TCP and IP parameters identical to those that were sent by Node A.

Step [18]: The VNI creates the frame and notifies the higher layer protocol that data has been received. The data is passed through the higher layer protocols and to the TCP layer at Node B. The TCP layer processes the TCP segment.

Step [19]: The TCP layer at Node B responds to the TCP segment with the SYN flag set by sending a TCP segment with a SYN and ACK flag set to Node A.

Step [20]: The TCP layer at Node A receives the TCP segment from Node B with the SYN and ACK flag set and responds with a TCP segment with the ACK flag set which end the handshaking process and both TCP layers are synchronized and ready to exchange data.

Figure 6A:
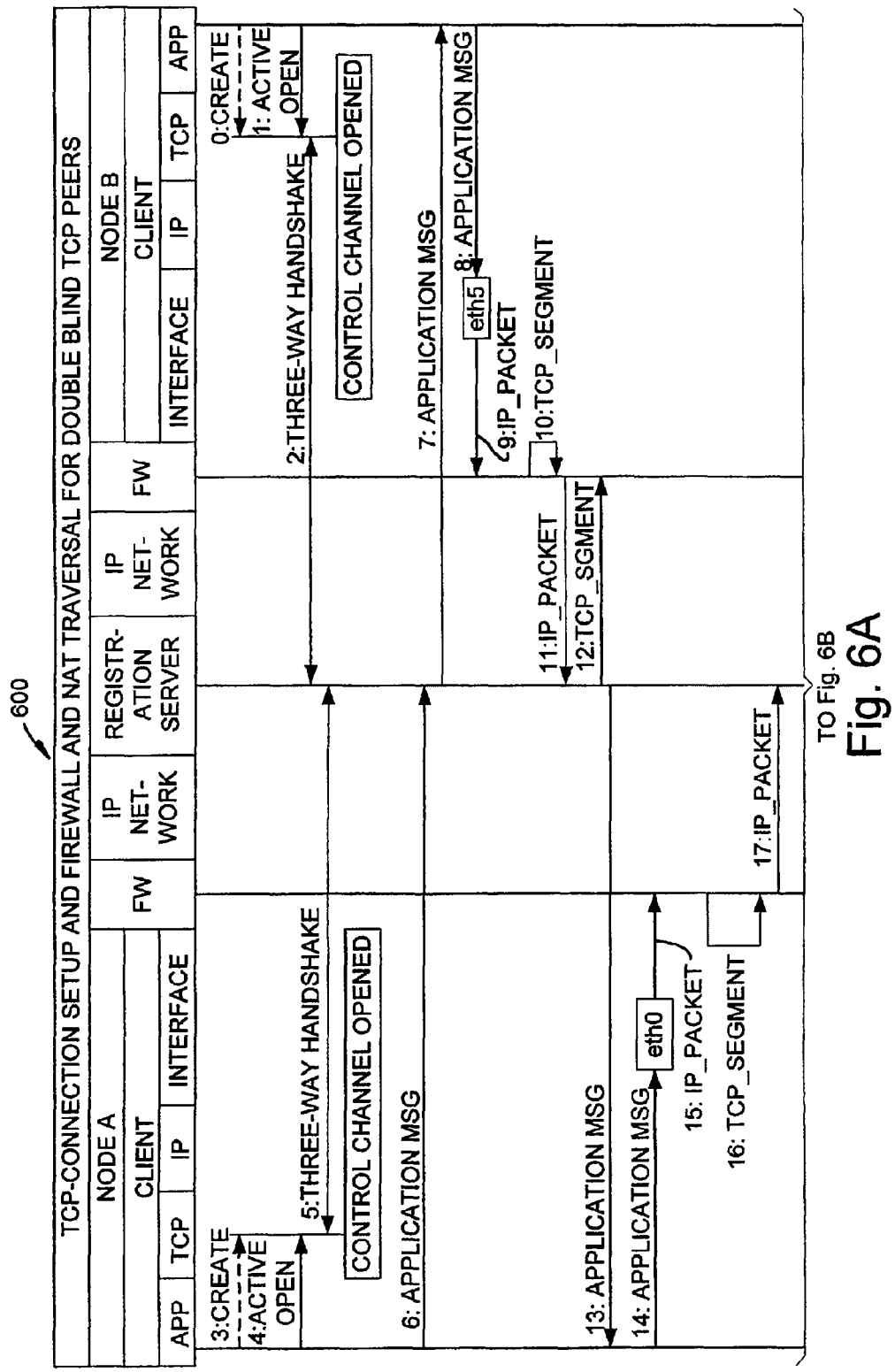
FIG. 6 is a sequence diagram demonstrating an execution of an example of a Connection Setup and Firewall and NAT Traversal for Double Blind TCP Peers protocol using the system proposed in embodiment of this invention.
Figure 6B:
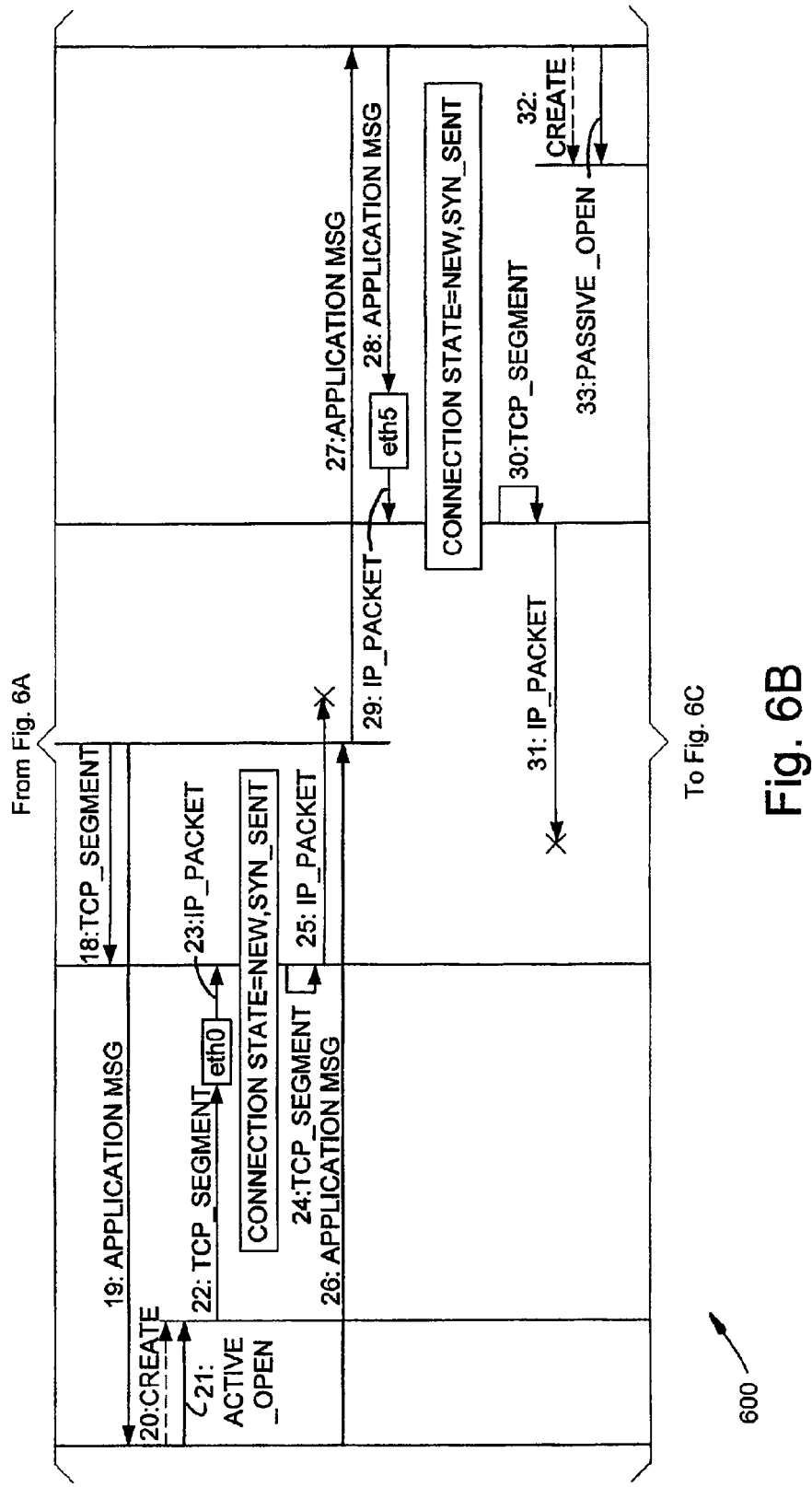
Figure 6C:
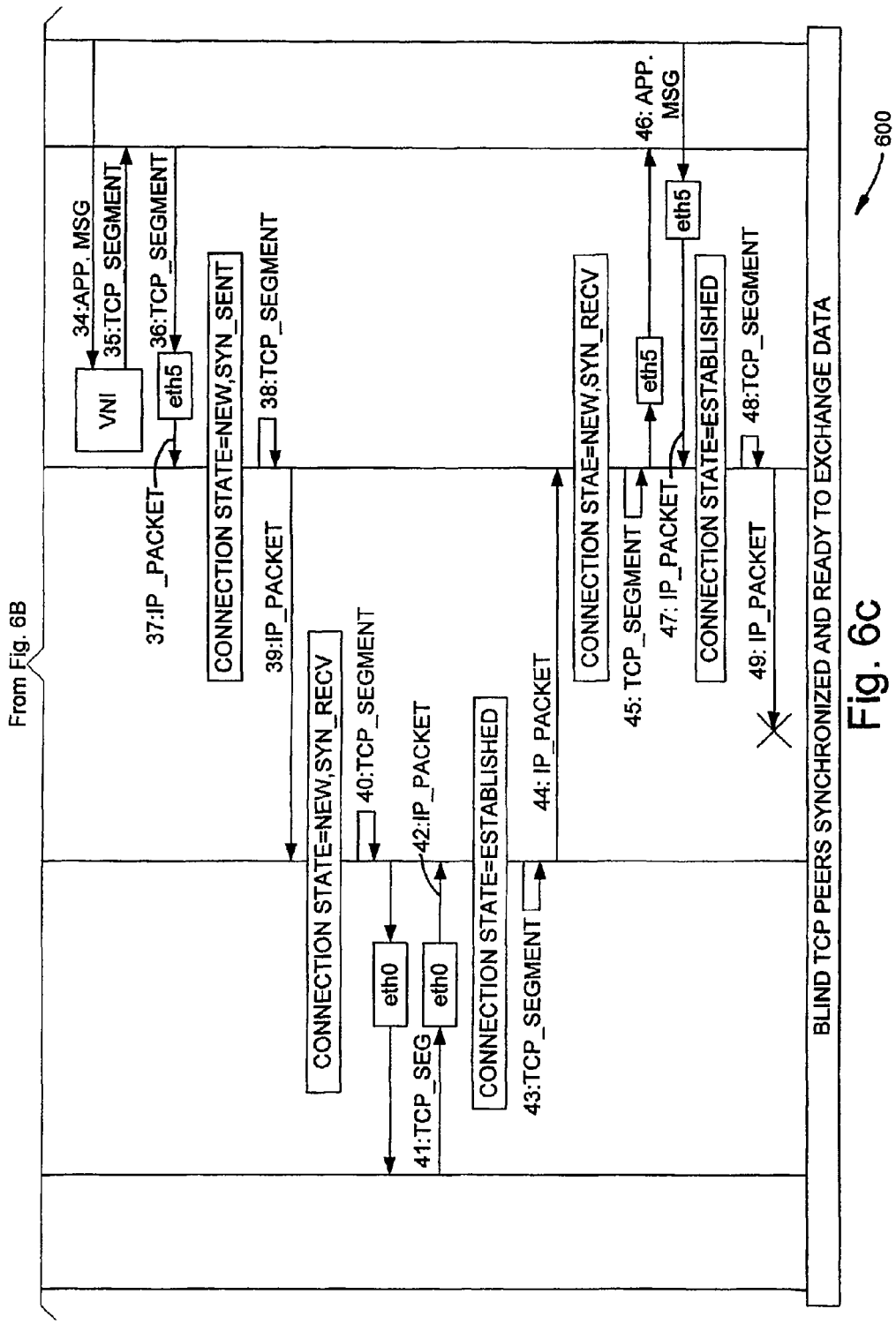

An embodiment of the invention involves using the RS, AA, and the VNI to execute a protocol, referred to as Connection Setup and Firewall and NAT Traversal for Double Blind TCP Peers, that traverse the NAT, synchronizes two "blind" TCP peers and establishes a connection in each peer firewall that allows for peer-to-peer TCP data exchange. A detailed description of an example Connection Setup and Firewall and NAT Traversal for Double Blind TCP Peers protocol is given in the sequence diagram in FIG. 6 and described below:

Steps [0-2]: Node B opens a standard TCP connection with the registration server. No special setup is required since the registration server (RS) is publicly available server and the connection is a standard client-server TCP connection. This connection is used to pass control messages from Node B to the registration server. During this process Node B is identified as a node in the namespace managed by the RS and its mapping is updated.

Steps [3-5]: Node A opens a standard TCP connection with the registration server. No special setup is required since the registration server (RS) is publicly available server and the connection is a standard client-server TCP connection. This connection is used to pass control messages from Node A to the registration server. During this process Node A is identified as a node in the namespace managed by the RS and its mapping is updated.

Step [6]: The AA on Node A sends an application message over the control channel to the RS requesting a connection with Node B.

Step [7]: The RS sends an application message over the control channel to Node B requesting a port probe. A probe port is an arbitrary port selected by the RS. Step [8]: The AA on Node B interfaces directly its physical network interface to create a frame that is used to probe for its IP address and SNAT port information. The frame contains the TCP information of its source port and destination port of the registration server as well as its IP address and IP address of the registration server.

Step [9]: The physical network interface sends the frame to the firewall that contains the TCP information of its source port and destination port of the registration server as well as its IP address and IP address of the registration server.

Step [10]: The firewall receives the frame and therefore the TCP/IP packet and TCP source port is changed and mapped (i.e., SNAT) to a firewall port that depends on the source port (Port_Y), source IP address (Address_B), destination port (Probe) and destination address (Reg_Server).

Step [11]: The firewall changes the source IP address to its own IP address and sends the packet to the RS where the RS records the source IP address and source TCP port. The RS uses this information to find the SNAT mapping for new connection. This probing process may consist of a series of TCP connections followed by resets to enable the registration server to understand the algorithm used in the firewall to assigning ports to outgoing connections during the SNAT process.

Step [14]: The RS sends back to the firewall a TCP segment with the RST bit flag set that resets SNAT mapping and release the connection in the firewall. Therefore, this firewall port may be used by another outgoing connection.

Step [13]: The RS sends an application message over the control channel to Node A requesting a port probe.

Step [14]: The AA on Node A interfaces directly its physical network interface to create a frame that is used to probe for its IP address and SNAT port information. The frame contains the TCP information of its source port and destination port of the registration server as well as its IP address and IP address of the registration server.

Step [15]: The physical network interface sends the frame to the firewall that contains the TCP information of its source port and destination port of the registration server as well as its IP address and IP address of the registration server.

Step [16]: The firewall receives the frame and therefore the TCP/IP packet and the TCP source port is changed and mapped (i.e., SNAT) to a firewall port that depends on the source port (Port_X), source IP address (Address_A), destination port (Probe) and destination address (Reg_Server).

Step [17]: The firewall changes the source IP address to its own IP address and sends the packet to the RS where the RS records the source IP address and source TCP port. The RS uses this information to find the SNAT mapping for a new connection.

Step [18]: The RS sends back to the firewall a TCP segment with the RST bit flag set that resets SNAT mapping and releases the connection in the firewall. Therefore, this firewall port may be used by another outgoing connection.

Step [19]: The RS notifies the AA on Node A using the control channel that it can send a TCP segment to Node B with the SYN flag set. The RS also informs the AA on Node A of the IP address of the firewall for Node B and the value of the mapped port (i.e., SNAT(Port_Y, Address_B,Probe,Reg_Server)) discovered in the probe phase.

Step [20,21]: An application creates a TCP socket connection in active open mode with the TCP parameters specified in Step 19 and including its source IP address (Address_A), source TCP port (Port_X), destination IP address (Address_FW-B) and destination port (SNAT (Port_Y, Address_B,Probe,Reg_Server)).

Step [22]: The TCP layer generates a TCP segment with the SYN flag set.

Step [23]: The network interface send the frame to the firewall, which create an entry in the firewall connection tracking table with a state of NEW, SYN_Sent. The entry in the connection tracking table is for (Source Port, Source Address, Destination Port, Destination Address) specified in Step 20 and 21.

Step [24]: The firewall receives the frame and therefore the TCP/IP packet and the TCP source port is changed and mapped (i.e., SNAT) to a firewall port that depends on the source port (Port_X), source IP address (Address_A), destination port (SNAT(Port_Y,Address_B, Probe,Reg_Server)) and destination address (Address_FW-B). The firewall mapped port assigned during this SNAT processes will be the same as the port assigned during the probe phase in Step 16 since most SNAT processes try to preserve the TCP connection as much as possible and the port assigned during the probe phase was freed in Step 18. If the behavior of the port assignment used by the firewall is non-typical, a more sophisticated probing process can be used to find the assigned port for the new connection. The more sophisticated probing process would consist of a series of TCP connections to the RS, followed by resets. Opening a succession of these connections will allow the RS to understand the algorithm used be the firewall in assigning ports to new outgoing connections.

Step [25]: The firewall changes the source IP address to its own IP address and sends the packet to the firewall for Node B. If this packet is received by the firewall for Node B, it will drop the packet since the firewall does not allow incoming connection requests. In some cases, the firewall may send a reset (RST) back to the sender (firewall for Node A), which would reset the connection state entered in Step 21. To ensure that the packet is not received by the firewall for Node B, the AA on Node A can set the Time-to-Live (TTL) flag in IP packet header created in Step 20 to a small value (for example, 2 or 3) so it will be dropped by the IP network during routing. The exact value can be inferred by sending a series ICMP packets with increasing TTL values. This is the same procedure used today in the TRACEROUTE utility that reports the number of hops between nodes in the Internet.

Step [26]: The AA on Node A sends an application message over the control channel to the RS notifying that it has sent the TCP segment with SYN flag set to Node B.

Step [27]: The RS sends an application message over the control channel to Node B to send a TCP segment with SYN and ACK flag set to Node A. The RS inform the AA on Node B of the destination address for Node A (Address_FW-A) and the destination port (SNAT(Port_X, Address_A,Probe,Reg_Server)) is the same value assigned by the SNAT process in Step 22.

Step [28]: The firewall will not allow a packet to leave its private network until there is an entry in the connection tracking table for the connection. In most firewalls, only TCP segments with SYN flag can create an entry in the connection tracking table. Therefore, the AA on Node B must send a TCP segment with the SYN flag set before sending the TCP segment with the SYN and ACK flag set. The AA on Node B interfaces directly with its physical network interface to construct a frame that contains an TCP segment with the SYN flag set as well as its source port (PortY) and destination port (SNAT(Port_X, Address_A,Probe,Reg_Server)) and its source IP address (Address_B) and destination IP address (Address_FW-A).

Step [29]: The physical network interface sends the frame to the firewall, which create an entry in the firewall connection tracking table with a state of NEW, SYN_Sent. The entry in the connection tracking table is for (Source Port, Source Address, Destination Port, Destination Address).

Step [30]: The firewall receives the frame and therefore the TCP/IP packet and TCP source port is changed and mapped (i.e., SNAT) to a firewall port that depends on the source port (Port_Y), source IP address (Address_B), destination port (SNAT(Port_X,Address_A, Probe,Reg_Server)) and destination address (Address_FW-A). The firewall mapped port assigned during this SNAT processes will be the same as the port assigned during the probe phase in Step 10 since most SNAT processes try to preserve the TCP connection as much as possible and the port assigned during the probe phase was freed in Step 12. If the behavior of the port assignment used by the firewall is non-typical, a more sophisticated probing process can be used to find the assigned port for the new connection. The more sophisticated probing process would consist of a series of TCP connections to the RS, followed by resets. Opening a succession of these connections will allow the RS to understand the algorithm used be the firewall in assigning ports to new outgoing connections.

Step [31]: The firewall changes the source IP address to its own IP address and sends the packet to the firewall for Node A. If this packet is received by the firewall for Node A, it will drop the packet since the firewall does not allow incoming connection requests. In some cases, the firewall may send a reset (RST) back to the sender (firewall for Node B), which would reset the connection state entered in Step 27. To ensure that the packet is not received by the firewall for Node B, the AA on Node B can set the Time-to-Live (TTL) flag of the IP packet created in Step 26 to a small value so it will be dropped by the IP network during routing.

Step [32,33]: An application creates a TCP socket connection in passive open mode bound to Port_Y.

Step [34]: The AA on Node B instructs its Virtual Network Interface (VNI) to create a physical layer frame with TCP and IP parameters provided by the RS in Step 27, i.e., source address (Address_FW-A), source port SNAT (Port_X,Address_A,Probe,Reg_Server)), destination address (Address_B) and destination port (Port_Y)

Step [35]: The VNI creates the frame and notifies the higher layer protocol that data has been received. The data is passed through the higher layer protocols and to the TCP layer at Node B. The TCP layer processes the TCP segment.

Step [36]: The TCP layer at Node B responds to the received TCP segment with the SYN flag set by sending a TCP segment with a SYN and ACK flag and source port (Port_Y) and destination port (SNAT(Port_X,Address_A,Probe,Reg_Server)).

Step [37]: The physical network interface sends the frame that contains the TCP segment in Step 36 and IP source address (Address_B) and destination address (Address_FW-A), which refreshes the entry in the firewall connection tracking table established in Step 29 with a state of NEW, SYN_Sent.

Step [38]: The firewall receives the frame and therefore the TCP/IP packet and TCP source port is changed and mapped (i.e., SNAT) to the same value as in Step 30 since it is part of the same connection, that is the source port, source address, destination port, destination address are the same as in Step 30.

Step [39]: The firewall changes the source IP address to its own IP address and sends the packet to the firewall for Node A, which updates the connection state established in Step 23 to NEW, SYN_Recv.

Step [40]: The firewall receives the TCP segment, which is part of an existing connection found in the connection table, and reverse the mapping (DNAT) according to the mapping created during the SNAT process in Step 24. The firewall then sends the packet to the TCP/IP layers on Node A.

Step [41]: The TCP layer on Node A responds to the TCP segment received by sending and new TCP segment with the ACK flag set.

Step [42]: The physical network interface sends the frame that contains the TCP, which refreshes the entry in the firewall connection tracking table established in Step 23 with a state of ESTABLISHED.

Step [43]: The firewall receives the frame and therefore the TCP/IP packet and the TCP source port is changed according to the mapping defined in Step 24 when the mapping was created.

Step [44]: The firewall changes the source IP address to its own IP address and sends the packet to the firewall for Node B, which updates the connection state to NEW, SYN_Recv.

Step [45]: The firewall receives the TCP segment, which is part of an existing connection found in the connection table, and reverses the mapping (DNAT) according to the mapping created during the SNAT process in Step 30. The firewall then sends the packet to the TCP/IP layer on Node B, which completes the TCP handshaking protocol for the TCP layers on Node A and B.

Step [46]: The connection state in the firewall for node B still needs to get updated to ESTABLISHED. To achieve the update, the AA on Node B, directly with its physical network interface constructs a frame that contains a TCP segment with the ACK flag set.

Step [47]: The physical network interface sends the frame to the firewall, which updates the entry in the firewall connection tracking table to ESTABLISHED.

Step [48]: The firewall receives the frame and therefore the TCP/IP packet and TCP source port is changed and mapped (i.e., SNAT) to the same value as in Step 28.

Step [49]: The firewall changes the source IP address to its own IP address and sends the packet to the firewall for Node A. If this packet is received by the firewall for Node A, it may (in some cases) disturb the connection established. To ensure that the connection is not disturbed, the AA on Node B can set the Time-to-Live (TTL) flag of the IP packet created in Step 40 to a small value so it will be dropped by the IP network during routing. At this point both firewalls for Node A and B are in the ESTABLISHED state and Nodes A and B can send and receive TCP segments.

Once the peer-to-peer TCP connection is established, it can be used to create a new virtual private networking interface. Existing TCP-based applications can use this network interface to bind to any available TCP port to connect with the corresponding peer without the need for any modifications to the existing application.

We claim:

1. A method of establishing an end-to-end TCP connection between first and second peers separated from one another by at least one firewall, comprising the steps of:
    setting up a control channel between the two TCP peers;
    instructing a TCP layer in each of the two TCP peers to open a TCP connection;
    relaying a TCP three-way handshaking control message sequence between the two TCP peers using the control channel;
    passing the TCP three-way handshaking control message sequence into a TCP/IP protocol stack on each of the two TCP peers; and
    establishing a TCP connection between the peers.

2. A system for establishing an end-to-end TCP connection between first and second peers separated from one another by at least one firewall, comprising:
    means for setting up a control channel between the two TCP peers;
    means for instructing a TCP layer in each of the two TCP peers to open a TCP connection;
    means for relaying a TCP three-way handshaking control message sequence between the two TCP peers using the control channel;
    means for passing a TCP three-way handshaking control message sequence into a TCP/IP protocol stack on each of the two TCP peers; and
    means for establishing a TCP connection between the two TCP peers.

* * * * *